US006988402B2

(12) United States Patent
Hasselbrink, Jr. et al.

(10) Patent No.: US 6,988,402 B2
(45) Date of Patent: Jan. 24, 2006

(54) MOBILE MONOLITHIC POLYMER ELEMENTS FOR FLOW CONTROL IN MICROFLUIDIC DEVICES

(75) Inventors: Ernest F. Hasselbrink, Jr., Saline, MI (US); Jason E. Rehm, Alameda, CA (US); Timothy J. Shepodd, Livermore, CA (US); Brian J. Kirby, San Francisco, CA (US)

(73) Assignee: Sandia National Laboratories, Livermore, CA (US)

( * ) Notice: Subject to any disclaimer, the term of this patent is extended or adjusted under 35 U.S.C. 154(b) by 327 days.

(21) Appl. No.: 10/655,337

(22) Filed: Sep. 4, 2003

(65) Prior Publication Data

US 2005/0097951 A1 May 12, 2005

Related U.S. Application Data

(60) Division of application No. 10/141,906, filed on May 8, 2002, now Pat. No. 6,952,962, which is a continuation-in-part of application No. 09/695,816, filed on Oct. 24, 2000, now Pat. No. 6,782,746.

(51) Int. Cl.
*G01F 3/08* (2006.01)

(52) U.S. Cl. ........................................ 73/253; 428/375

(58) Field of Classification Search .................. 73/253; 210/635, 656; 428/375; 96/1; 204/157.15, 204/450; 427/115
See application file for complete search history.

(56) References Cited

U.S. PATENT DOCUMENTS 6,770,201 B2 * 8/2004 Shepodd et al. ............ 210/635
6,865,939 B2 * 3/2005 Kirby et al. .................. 73/253

* cited by examiner

*Primary Examiner*—Edward Lefkowitz
*Assistant Examiner*—Jewel V. Thompson
(74) *Attorney, Agent, or Firm*—Donald A. Nissen

(57) ABSTRACT

A cast-in-place and lithographically shaped mobile, monolithic polymer element for fluid flow control in microfluidic devices and method of manufacture. Microfluid flow control devices, or microvalves that provide for control of fluid or ionic current flow can be made incorporating a cast-in-place, mobile monolithic polymer element, disposed within a microchannel, and driven by fluid pressure (either liquid or gas) against a retaining or sealing surface. The polymer elements are made by the application of lithographic methods to monomer mixtures formulated in such a way that the polymer will not bond to microchannel walls. The polymer elements can seal against pressures greater than 5000 psi, and have a response time on the order of milliseconds. By the use of energetic radiation it is possible to depolymerize selected regions of the polymer element to form shapes that cannot be produced by conventional lithographic patterning and would be impossible to machine.

17 Claims, 10 Drawing Sheets

Liquid/Liquid interface barrier

Liquid (left)/gas (right) interface barrier

MOBILE MONOLITHIC POLYMER ELEMENTS FOR FLOW CONTROL IN MICROFLUIDIC DEVICES

CROSS-REFERENCE TO RELATED APPLICATIONS

This application is a division of prior application Ser. No. 10/141,906 filed May. 8, 2002 now U.S. Pat. No. 6,952,962 which is a Continuation-in-Part of application Ser. No. 09/695,816 now U.S. Pat. No. 6,782,746, filed Oct. 24, 2000.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The invention is directed generally to improved apparatus for controlling and regulating the flow of fluids in microfluidic systems and particularly to devices that control and regulate fluid flow in microfluidic systems by means of a mobile, monolithic polymer element. The invention further includes methods for the manufacture of these monolithic polymer elements that provides for the polymer element to be cast-in-place in such a manner that the element will conform to the shape of the microchannel walls and not bond to the microchannel walls, thereby retaining mobility.

BACKGROUND OF THE INVENTION

Recent advances in miniaturization have led to the development of microfluidic systems that are designed, in part, to perform a multitude of chemical and physical processes on a micro-scale. Typical applications include analytical and medical instrumentation, industrial process control equipment, and liquid and gas phase chromatography. In this context, there is a need for devices that have fast response times to provide very precise control over small flows as well as small volumes of fluid (liquid or gas) in microscale channels. In order to provide these advantages, it is necessary that the flow control devices be integrated into the microfluidic systems themselves. The term "microfluidic" refers to a system or device having channels or chambers that are generally fabricated on the micron or submicron scale, i.e., having at least one cross-sectional dimension in the range from about 0.1 $\mu$m to about 500 $\mu$m. Examples of methods of fabricating such microfluidic systems can be found in U.S. Pat. No. 5,194,133 to Clark et al., U.S. Pat. No. 5,132,012 to Miura et al., U.S. Pat. No. 4,908,112 to Pace, U.S. Pat. No. 5,571,410 to Swedberg et al., and U.S. Pat. No. 5,824,204 to Jerman.of Although there are numerous micro-fabricated valve designs that use a wide variety of actuation mechanisms (Shoji and Esashi, J. Micromech. Microeng., 4, 157–171, 1994), most dissipate relatively large amounts of power to the chip or substrate or require complex assembly which limits their use in practical systems. Most microvalves are manufactured from silicon and are therefore not easily integrated into non-silicon microchip platforms such as silica, glass, or synthetic materials such as organic polymers. A microvalve using an electromagnetic drive is described in U.S. Pat. No. 5,924,674 issued to Hahn et al. Jul. 20, 1999. Microvalves using thermopneumatic expansion as the actuation mechanism and a shape memory alloy diaphragm and bias spring are commercially available. However, these microvalves suffer from the fact that they consume relatively large amounts of power during operation, typically between 200 and 1500 mW depending upon the design. This high power consumption can be a significant disadvantage when heating of the fluid must be avoided, when batteries must supply power, or when the microvalve is placed on a microchip. Moreover, valves using the aforementioned actuation mechanisms can only generate modest actuation pressures and consequently, hold off only modest pressures. Perhaps most importantly, these valve designs can be difficult and costly to manufacture and assemble, frequently requiring assembly in a clean room environment.

Recognizing that the power requirements of conventional valves limited their use in practical systems, Beebe et al. (Nature, 404, 588–590, April 2000) describe a flow control system consisting of a hydrogel. The hydrogel valves provide local flow control by expanding or contracting when exposed to various pH levels. While eliminating the need for associated power supplies, these valves suffer from slow response times (~8–10 sec) and are able to withstand only modest pressure differentials.

Unger et al. (Science, 288, 113–116, April 2000) describe an arrangement for controlling fluid flow in microchannels. Flow control is accomplished by the use of soft elastomer "control lines" that intersect the microfluidic channels fabricated in an elastomeric substrate material. Applying pressure to the external surfaces of the control lines causes them to deform closing off that part of the channel they intersect. While eliminating the problem of power dissipation to the substrate, these valves require a microchannel having a specially shaped cross-section to seal properly. They also intrinsically require that pressure greater than in the channel be applied to the control line to keep the valve shut.

Ramsey in U.S. Pat. No. 5,858,195 provides for valveless microchip flow control by simultaneously applying a controlled electrical potential to an arrangement of intersecting reservoirs. The volume of material transported from one reservoir to another through an intersection is selectively controlled by the electric field in each intersecting channel. In addition to the need for elaborate switching and control of electrical potential, there are problems with leakage of fluid from one channel to another through the common intersection because there is no mechanical barrier to diffusion. Further, this flow control method has essentially no control over pressure-driven flow. For example, the flow control of a 10 mM aqueous buffer at pH 7, using a 1000 V/cm electric field in round channels about 50 $\mu$m in diameter, can be completely disrupted by a pressure gradient of only 0.1 psi/cm. Higher electric fields are generally prohibited because of rapid ohmic heating of the fluid. Furthermore, the presence of pH or conductivity gradients within the fluid can disrupt this valving scheme (Schultz-Lockyear et al., Electrophoresis, 20, 529–538, 1999).

SUMMARY OF THE INVENTION

Accordingly, the present invention is directed to a cast-in-place mobile monolithic polymer element or member and method of manufacture thereof, and devices for controlling and regulating fluid flow, including ionic current flow, that incorporate the novel mobile monolithic polymer element.

A microfluid control device, or microvalve, can be made that comprises generally a cast-in-place, mobile monolithic polymer element, disposed within a microchannel, and driven by a displacing force that can be fluid (either liquid or gas) pressure or an electric field against a sealing surface, or retaining means that can be a constriction or a stop in the microchannel, to provide for control of fluid flow. As a means for controlling fluid flow, these devices possess the additional advantage that they can be used to effect pressure and electric field driven flows, eliminate or enhance diffusive or convective mixing, inject fixed quantities of fluid, and selectively divert flow from one channel to various other channels. They can also be used to isolate electric fields, and, as a consequence, locally isolate electroosmotic or electrophoretic flows.

The mobile monolith polymer element of the invention is not restricted to any particular shape or geometry except by the configuration of microchannel in which it functions and the requirement that it provide an effective seal against fluid flow for valving applications.

By providing a method for producing a monolithic polymer element that does not bond to surrounding structures, these polymer elements are free to move within the confines of a microchannel and can be translated within the microchannel by applying a displacing force, such as fluid pressure or an electric field to the polymer element. It is well known in the art, that if a mobile body within a microchannel has a surface charge density that is different from that of the walls of the microchannel, the body can be translated in the microchannel by the application of an electric field. Hence, translation of the polymer element can also be achieved by application of electric fields.

By means of the invention, it is now possible to manufacture a family of fluid flow control, regulation, and distribution devices such as, but not limited to, microvalves, nano- and pico-liter pipettes and syringes needle valves, diverter valves, water wheel flow meters, and flow rectifiers.

In contrast to the prior art, the microfluid control devices, or microvalves, disclosed herein can seal against pressures greater than 5000 psi, dissipate no heat to a substrate, and have a response time on the order of milliseconds. Calculations show that a monolithic polymer element 50 $\mu$m in diameter and 200 $\mu$m long, with a 0.1 $\mu$m gap between the element and the wall has an actuation time (for a pressure differential across the element of about 1 psi) of about 1.1 msec.

The mobile polymer monolith microvalves are fabricated by photoinitiating phase-separation polymerization in specified regions of a three-D microstructure, typically glass, silicon, or plastic. Functionality is achieved by controlling monolith shape and by designing the polymer monoliths to move within microfluidic channels. A central assumption in design of these mobile polymer monolith valve architectures is that in-situ fabrication of the polymer monoliths assures that their shape will conform to the microchannel geometry. This is easily confirmed during the polymerization process. Challenges occur when the monomer/solvent/photoinitiator mixture is flushed and replaced with the working fluids to be used for the end application. Differences in solvent properties between the monomer/solvent mixture and the working fluid can lead to an expansion or contraction in the porous polymer monolith, as the pore contents are filled or emptied to enable the system to achieve its lowest potential energy state. Contraction and expansion of the polymer monolith both lead to degradation of performance: expansion increases the force at the wall, increases friction, and thereby leads to increased actuation pressure requirements; contraction leaves gaps in between the polymer monolith and the wall, creating a leak path through which fluid may flow. Resistance to shape changes caused by differences in solvent properties can be overcome by the use of highly cross-linked polymer lattices, which have the very highest mechanical strength, yet because of their porous nature retain sufficient flexibility to form a seal against a hard sealing surface.

Electrostatic attraction between microchannel wails and the polymer element that could influence the mobility of the polymer element is of particular concern. However, by providing for the polymer and microchannel surfaces to have the same, or no, electric charge it has been found that the monolithic polymer element will not bond with or be attracted to the microchannel wall. Thus, the element can be moved back and forth freely within the microchannel by application of pressure to either end of the element, i.e., by developing a pressure differential across the polymer element.

The profile of the polymer element can be further configured by the directed application of radiation, preferably from a laser, to selected regions of the actuator causing the polymer in the irradiated regions to depolymerize. This can include, by way of example, making the middle part of the actuator narrower than the ends or vice versa. Because the monolithic polymer element can be manufactured in-place within minutes the microfluid control devices that employ them do not require expensive and complicated manufacturing and/or assembly processes.

BRIEF DESCRIPTION OF THE DRAWINGS

The accompanying drawings, which are incorporated in and form part of the specification, illustrate the present invention and, together with the description, explain the invention. In the drawings like elements are referred to by like numbers.

DETAILED DESCRIPTION OF THE INVENTION

The present invention comprises a mobile monolithic polymer element that can be cast-in-place in a microchannel to control fluid and ionic current flow. The mobile monolithic polymer element of the invention is not restricted to any particular shape or geometry except by the configuration of the microchannel in which it functions and the requirement that it provide an effective seal against fluid flow at pressure up to at least 5000 psi. The invention further includes a method for the manufacture of these monolithic polymer elements that provide for the polymer element not only to be cast-in-place but also is such that the element will not chemically bond or be electrostatically attracted to the microchannel walls, thereby retaining mobility in the microchannel. Thus, the polymer elements are free to move within the confines of a microchannel and can be driven back and forth within the microchannel by appropriate application of a displacing force, pressure or an electric field. Consequently, the invention provides for incorporating a valve into a unitary structure that can be created in-situ on a substrate or microchip for controlling fluid flows in microchannels, wherein the fluid can be either liquid or gas.

Throughout the written description of the invention the terms channel and microchannel will be used interchangeably. Furthermore, the term "microfluidic" refers to a system or device having channels or chambers that are generally fabricated on the micron or submicron scale, e.g., having at least one cross-sectional dimension in the range from about 0.1 $\mu$m to about 500 $\mu$m, i.e., microchannels. The term fluid can refer to either a liquid or gas, the meaning being generally apparent from the context.

While the structure and function of the invention will be described and illustrated in relation to the microchannels and arrangements thereof it is understood that the microchannels themselves are part of a microfluidic device. The microfluidic device can be comprised of channels, reservoirs, and arbitrarily shaped cavities that are fabricated using any of a number of art recognized microfabrication methods, including injection molding, hot embossing, wet or dry etching, or deposition over a sacrificial layer. The microfluidic device can also include holes and/or ports and/or connectors to adapt the microfluidic channels and reservoirs to external fluid handling devices.

Figure 1:
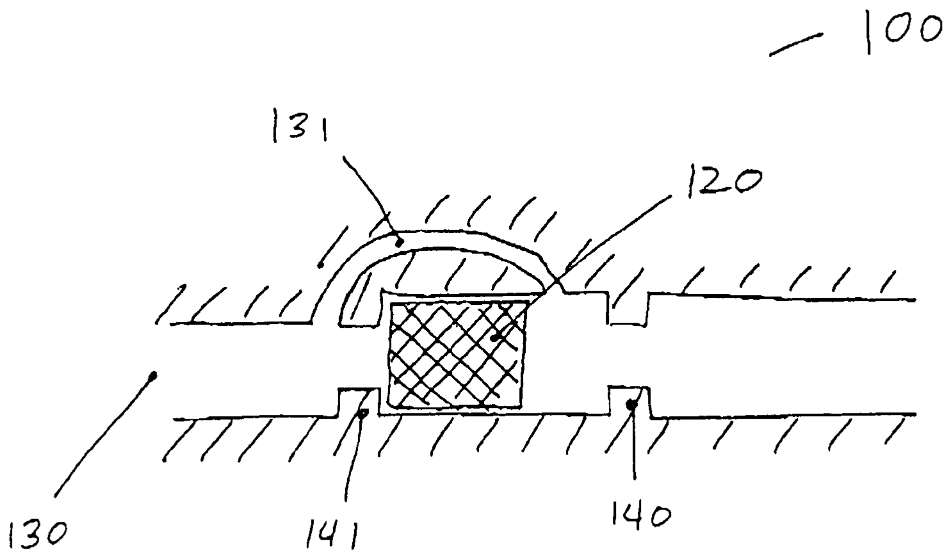
FIG. 1 is an embodiment of the invention illustrating its general principle and operation.

FIG. 1 illustrates and embodies the principle and operation of the present invention, using the inventive mobile monolithic polymer element for controlling fluid flow. Device 100 is a check valve embodiment and comprises a mobile polymer element 120 disposed within a microchannel 130, provided with first and second inlets and retaining means 140 and 141. The monolithic polymer element is fabricated within the microchannel and thus conforms to the shape of the microchannel. Hydraulic pressure, applied by pressure means such as an HPLC pump or an electrokinetic pump (such as described in U.S. Pat. Nos. 6,013,164 and 6,019,882 to Paul and Rakestraw) to either end of element 120 causes it to move one direction or the other in response to the applied pressure. When pressure is applied to the first, or right, inlet of microchannel 130, element 120 is moved to the left whereupon it seats against retaining means 141, allowing fluid to flow around it through bypass duct 131. However, when pressure is applied to the second, or left inlet, of microchannel 130, element 120 is moved to the right, where it seats against retaining means 140, and fluid flow is restricted or stopped.

Figure 2:
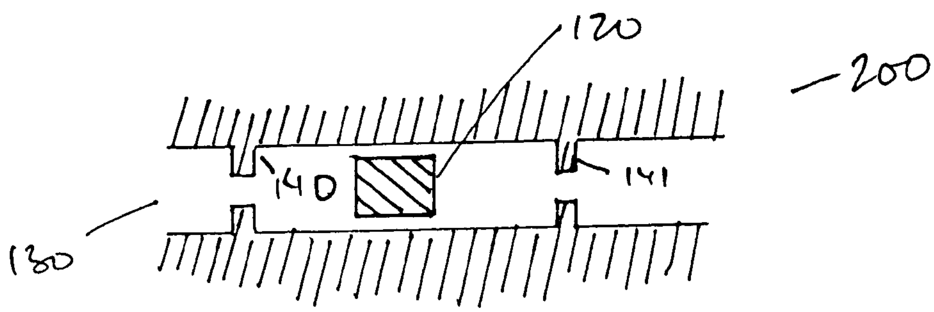
FIG. 2 illustrates a fixed volume syringe.

FIG. 2 illustrates another embodiment of the invention, a fixed volume injector or syringe 200. Two spaced apart retaining means 140 and 141 are fixed in microchannel 130 and the distance between them defines a fixed volume. A mobile polymer element or piston 120 is disposed in the microchannel and between the retaining means. By immersing one end of microchannel 130 into a liquid and applying a vacuum to the opposite end of the microchannel, or pressurizing the liquid, a volume of liquid can be drawn up onto the channel; the volume of liquid being determined by the distance between retaining means 140 and 141, minus the length of piston 120. By reversing the displacing force, the volume of liquid can be ejected. The check valve embodiment 100 and the fixed volume injector 200 can be combined to form a fixed volume pipette capable of sampling a fixed volume of fluid from one channel and depositing it into another.

Figure 3A:
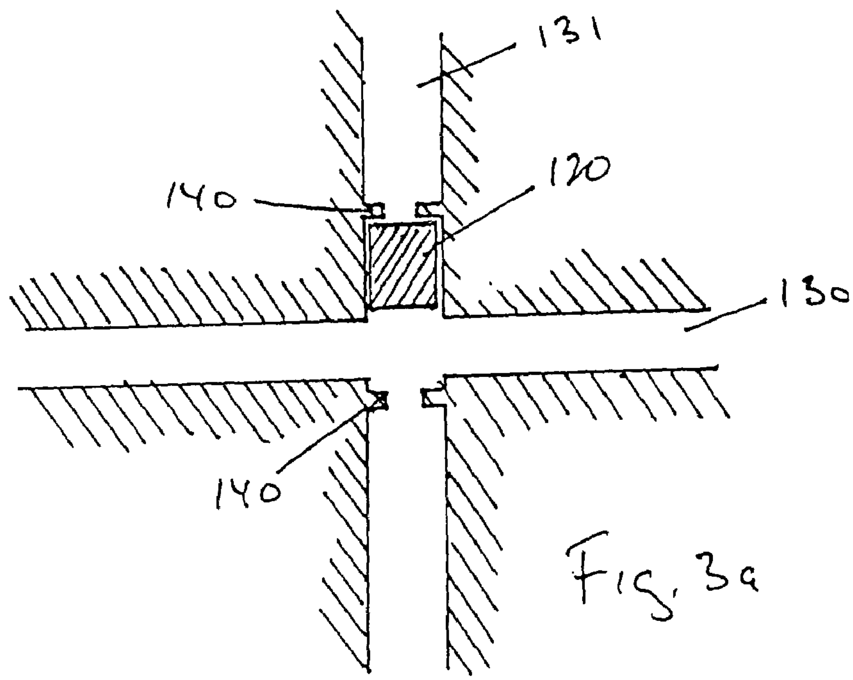
FIGS. 3*a* and 3*b* illustrate a shut-off valve configuration.
Figure 3B:
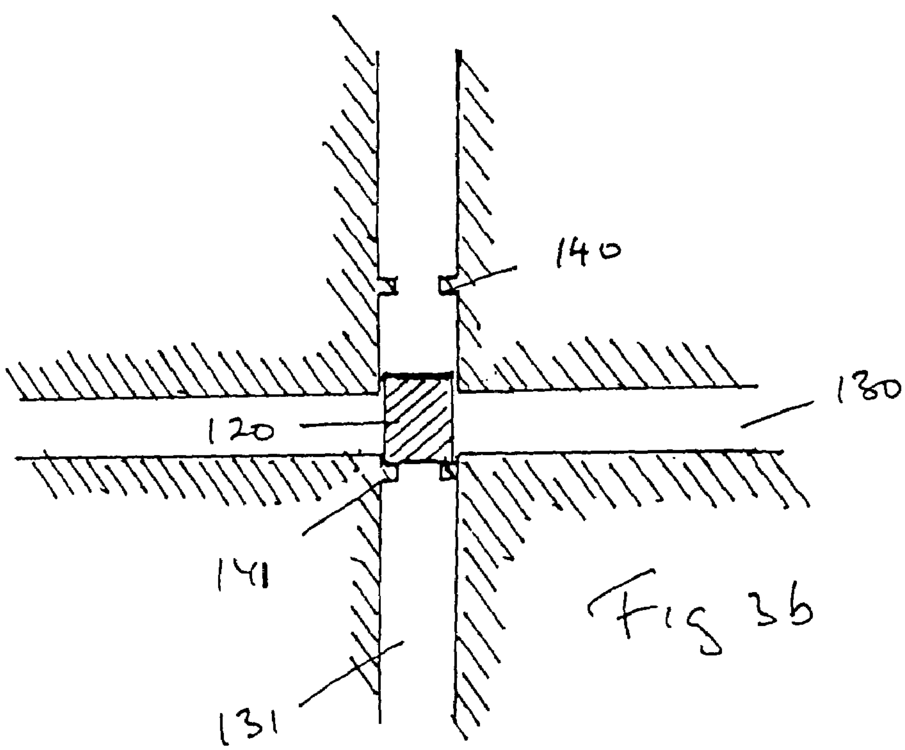

Another embodiment of the invention, a shut-off valve 300, is illustrated in FIGS. 3*a* and 3*b*. Microchannel 130 is intersected by a second microchannel 131. Microchannel 131 has a mobile polymer plug 120 disposed therein. In the open position (FIG. 3*a*) polymer plug 120 is drawn up into microchannel 131 and against retaining means 140. Applying gas or liquid pressure to microchannel 131 forces polymer plug 120 into the channel intersection (FIG. 3*b*) against retaining means 141 stopping fluid flow or ionic current flow through microchannel 130.

Figure 4A:
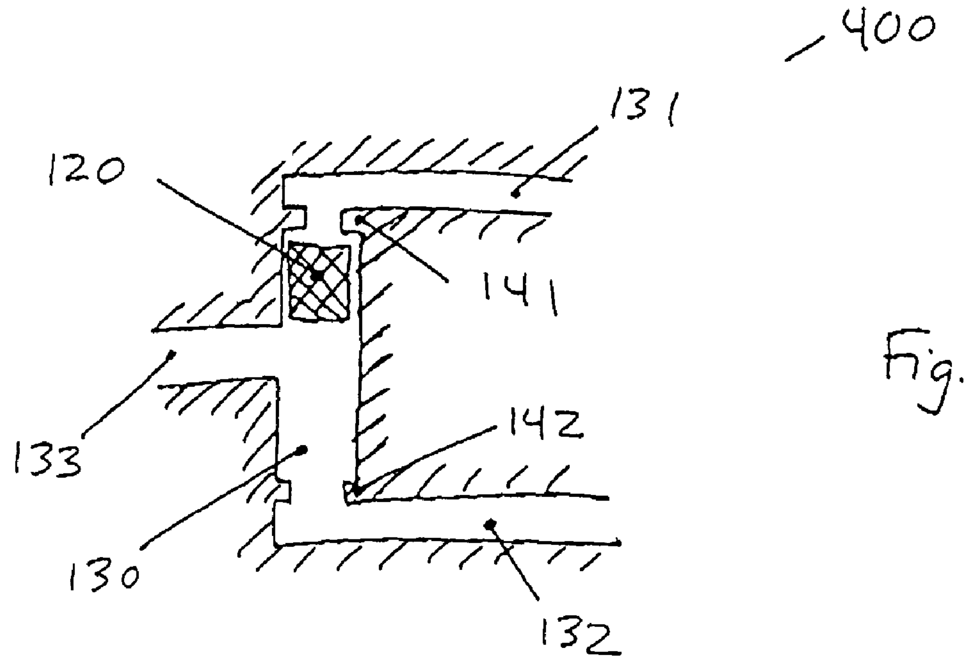
FIGS. 4*a* and 4*b* illustrate the operation of a two-way valve configuration.
Figure 4B:
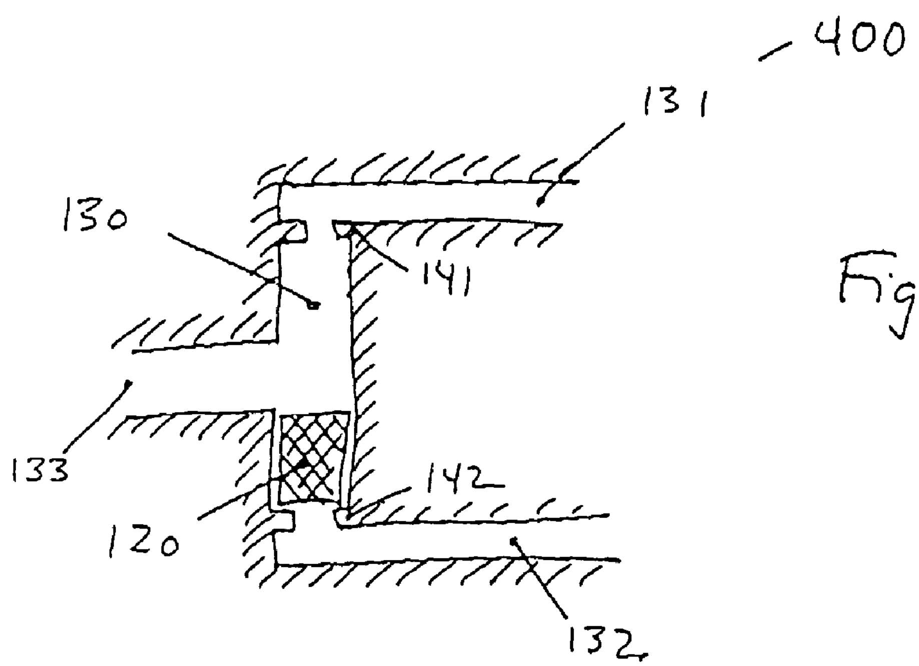

A further embodiment, a two-way valve 400, is illustrated in FIGS. 4*a* and 4*b*. Microchannels 131 and 132 provide for fluid inlet to a common intersection 130, having retaining means 141 and 142 disposed at each end of the intersection, and a polymer plug 120 disposed therein. Outlet microchannel 133 intersects common intersection 130 between the two retaining means 140 and 141. The device prevents pressure-driven flow from one inlet microchannel from entering the other inlet microchannel. By way of example, application of fluid pressure to microchannel 132 causes element 120 to be driven towards channel 131 where it is seated against retaining means 141 blocking flow into channel 131 (FIG. 4*b*). In this way, fluid can flow from one inlet channel without causing contamination of, or flow into, the other inlet channel. Multiple channel valves can be constructed by connecting multiple two-channel valves, such as valve 400, in series. By way of example, the outlet channel 133 can be connected to either of inlet channels 131 or 132 of a second two-channel valve, along with a third inlet channel. The application of pressure to any one of the three inlet channels can result in flow of only the pressurized fluid with little or no contamination of the other two input fluids.

Figure 5A:
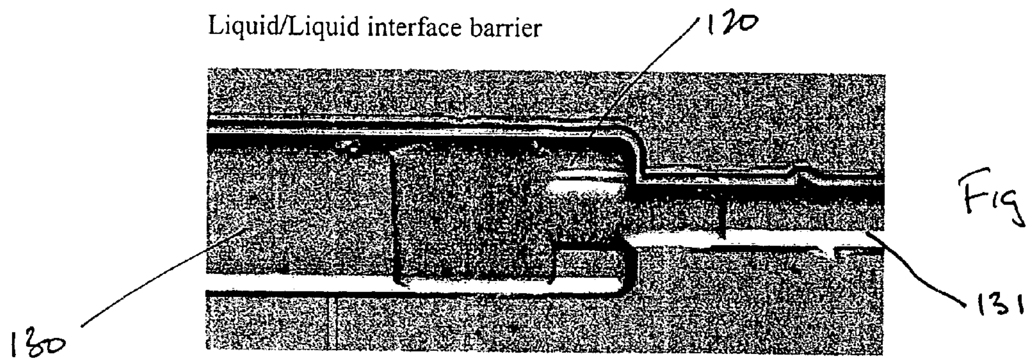
FIGS. 5*a* and 5*b* are micrographs that show the sealing action of a cast-in-place variable area polymer element in a microchannel.
Figure 5B:
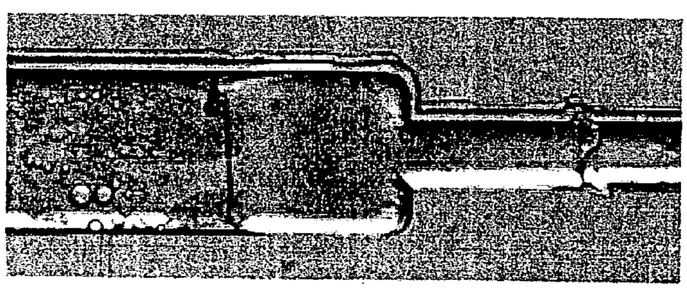

In microfluidic systems generally it can be desirable to amplify fluid pressures, particularly for mechanical linear actuation. This can be accomplished, as illustrated in FIGS. 5*a* and 5*b*, by means of a change in the cross-sectional area of the mobile monolithic element. A monolithic mobile plug 120 is fabricated in microchannel 130 (150 $\mu$m wide and 20 $\mu$m deep). As before, a pressurized fluid in contact with the left end of mobile plug 120 causes plug 120 to move to the right. This results in a lower rate of fluid flow in microchannel 131 (50 $\mu$m wide and 20 $\mu$m deep), but a higher pressure is developed in channel 131. Conversely, if pressurized flow forces mobile plug 120 to the left, away from microchannel 131, a higher flow rate, but lower pressure, is developed in microchannel 130.

Operation of the novel microchannel flow control devices disclosed above is dependent upon the ability to produce a monolithic polymer material that conforms to the shape of the microchannel, does not bond to surrounding structures, such as the microchannel walls, and can be polymerized by exposure to radiation, such as thermal radiation or visible or UV light. For purposes of describing the invention, the term "bond" will include electrostatic attraction as well as chemical bonding. Sources of such radiation include UV or visible lamps and lasers. Depending on the application, it can be desirable that the polymer monolith be either porous or nonporous; a property of the polymer generally defined by its formulation. The term "nonporous" means the absence of any porosity in the monolithic polymer element that would permit fluid under pressure, or otherwise, to pass through the polymer element. Thus, in most cases, any open porosity that might be present has a pore diameter less than 5 nm. The term "porous" means that a pressure differential across the element results in some fluid flow through it. In general, this means pores larger than about 20 nm. A meso-porous porosity range also exists between these two porosity ranges wherein ionic current can flow through the polymer element but bulk fluid flow is negligible.

There are four basic requirements that must be fulfilled for successful fabrication of a mobile monolithic polymer element within a microchannel: 1) the monomer mixture must flow readily within the microchannel; 2) polymerization is initiated by exposure to radiation; 3) the polymerized mixture must not bond to the channel wall; and 4) the polymer monolith will not change shape or size (i.e., expand or contract) when exposed to different solvents.

The first requirement can be fulfilled by the choice of solvent. The solvent not only acts to help mobilize the monomer mixture but also acts as a diluent controlling the rate of polymerization of the monomer and causing polymerization not to extend substantially beyond the boundary of the radiation used to initiate polymerization. The second requirement is aided by the addition of a UV or visible light polymerization compound, such as 2,2'-azobisisobutyronitrile, to the mixture.

The third requirement can be achieved by two means. First, by equivalence of surface charge, i.e., using a polymer having a surface charge of the same sign as that on the surface of the microchannel. By way of example, glass has exposed $SiO^-$ groups at a pH of 2 or greater. Thus, in order that a polymer material polymerized within a glass microchannel not bond to the glass surface, it too must have a negative surface charge.

Equivalence of surface charge of the polymer phase with that of the surrounding walls can be achieved by 1) adding suitable bifunctional monomers to the organic phase of the mixture to provide a charged polymer structure, or 2) by modifying the surface charge on a region of the microchannel wall by methods such as those described in U.S. Pat. No. 6,056,860 issued to Goretty et al. May 2, 2000.

Bonding of the polymer to the microchannel walls can also be prevented by making the microchannel generally non-reactive by treating the microchannel as disclosed by Goretty et al., by fabricating the microchannels on a non-reactive substrate, such as Teflon®, that does not bond with the formulations described herein, or by the use of fluorinated monomers to reduce surface energy.

Finally, since changes in solvent properties (polarity, hydrogen-bonding affinity) are unavoidable in many analysis and synthesis systems (examples include but are not limited to gradient HPLC, oligonucleotide synthesis, PCR, and protein crystallization), polymer monoliths must be designed to resist size and shape changes (i.e., expansion or contraction) upon solvent changes. We have achieved this through use of very highly cross-linked polymer lattices, which have the highest possible mechanical strength yet, because of their porous nature, retain sufficient flexibility to form a seal against a hard surface.

The requirements set forth above are met by the general class of monomer and solvents described below which form part of this invention. The monomer mixtures are designed to form a single phase mixture at temperatures below about 40° C. and can include:

1. A cross-linking agent selected from the group ethylene glycol diacrylate, diethylene glycol diacrylate, propylene glycol diacrylate, butanediol diacrylate, neopentyl glycol diacrylate, hexanediol diacrylate, pentaerythritol triacrylate, pentaerythritol tetracrylate, trimethylolpropane triacrylate, methacrylate equivalents of these acrylates, or divinyl benzene, and mixtures thereof. In a typical mixture, the cross-linking agent is generally present at about 20–100 vol % of the monomer mixture.
2. Tetrahydrofurfuryl acrylate (0–60 vol % of the monomer mixture).
3. A nonpolar monomer selected from the group branched or straight chain $C_1$–$C_{12}$ alkyl acrylates, styrene, fluorinated or methacrylate equivalents of these monomers, or mixtures thereof (0–80 vol % of the monomer mixture).
4. A monomer selected to carry a charge at some range of pH values between about 2 and 12. Monomers can include $C_1$–$C_{12}$ alkyl or aryl acrylates substituted with sulfonate, phosphate, boronate, carboxylate, amine, or ammonium, or acrylamido or methacryoyloxy analogs of the acryoyloxy compounds above, or mixtures of the above (0–5 vol % of the monomer mixture).

Polymerization inhibitors, both those naturally occurring (e.g., dissolved oxygen) and those added as stabilizers for storage (e.g., hydroquinone monomethyl ether (MEHQ)) can be included in the monomer mixture (0–1000 ppm).

The solvent system can comprise:

1. Water (0–40 vol %) containing 5–100 mM buffer salts.
2. Other solvents selected from $C_1$–$C_6$ alcohols, $C_4$–$C_8$ ethers, $C_3$–$C_6$ esters, $C_1$–$C_4$ carboxylic acids, methyl sulfoxide, sulfolane, or N-methyl pyrrolidone, dioxane, dioxolane, acetonitrile, and mixtures thereof (60–100 vol %).

The monomer to solvent ratio (by vol %) can vary from about 90:10 to 30:70 with a ratio of 60:40 preferred.

The following examples illustrate generally a method for preparing mobile monolithic polymer materials in capillaries and microchannels, in accordance with the present invention. These examples only serve to illustrate the invention and are not intended to be limiting. Modifications and variations may become apparent to those skilled in the art, how ever these modifications and variations come within the scope of the appended claims. Only the scope and content of the claims limit the invention.

EXAMPLE 1

A monomer mixture was prepared by mixing together the following constituents:

40 ml 1,3-butanedioldiacrylate (BDDA)

39 ml tetrahydrofurfuryl acrylate (THFA)

20 ml of hexyl acrylate 0.8 ml acryloyloxyethyltrimethylammonium methyl sulfate

A solvent was prepared by mixing together:

45 ml acetonitrile 40 ml 2-methoxyethanol 15 ml of 5 mM phosphate buffer (pH 8)

An amount of photo-initiator (such as 2,2'-azobisisobutyronitrile) equal to 0.5% of the weight of the monomer mixture was dissolved in the mixture. The monomer and solvent were mixed together in a ratio (by vol %) of 60:40 and the mixture was filtered and degassed to remove polymerization inhibitors. The mixture was then injected into a microchannel and polymerized.

EXAMPLE 2

A monomer/solvent mixture can be prepared by mixing together the following constituents:

64 ml pentaerythritol triacrylate (PETRA)

36 ml 1-propanol, and

An amount of photo-initiator (such as 2,2'-azobisisobutyronitrile) equal to 0.5% of the weight of the PETRA.

The mixture can then be filtered, injected into microchannels, and photopolymerized.

Figure 6:
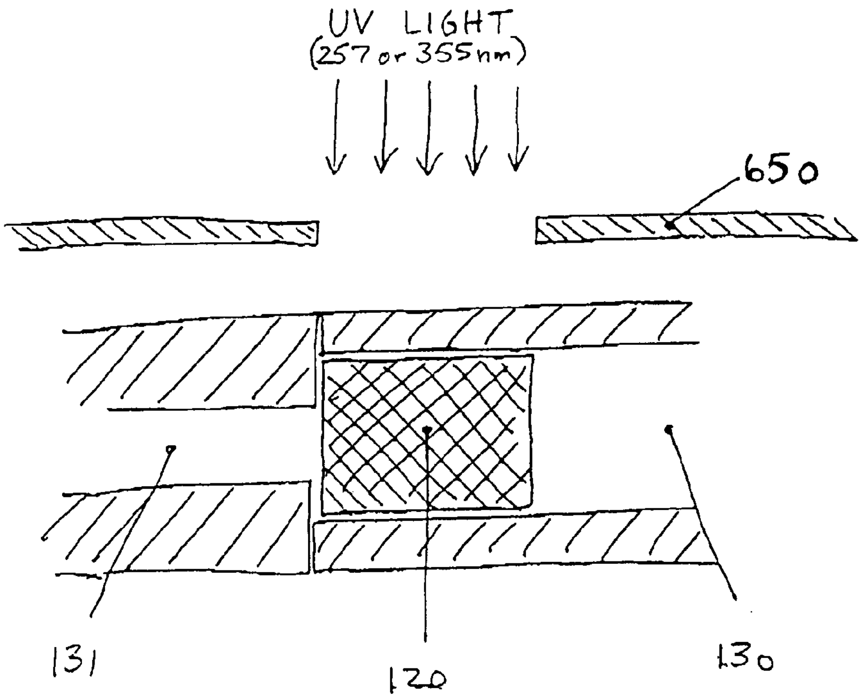
FIG. 6 illustrates a method for manufacture of a polymer element in a microchannel.

Referring now to FIG. 6, a mask 650 defining the outline of the polymer monolith to be produced was applied to the surface of a silica capillary tube arrangement comprising a silica capillary 131, about 50 $\mu$m wide, and silica capillary 130, about 100 $\mu$m wide, joined together on a common axis (FIG. 6), the combination having zero dead volume at the intersection. The liquid mixture was loaded into the capillaries and polymerized by exposure to a UV lamp (0.2 W/cm$^2$), through mask 150, for about 4 minutes to form the solid polymer element 120 shown in FIG. 6. The polymer element shown in FIG. 6 was very similar in appearance to that of FIG. 5, except that the element did not extend into the smaller diameter channel. The polymerization time can vary depending upon the intensity and wavelength of the radiation source. Polymer elements have been fabricated in this manner using light having wavelengths between about 257 nm and 405 nm. In each case, the photoinitiator should absorb the light used for polymerization.

In another embodiment, the local region of polymerization is specified by focusing a point or collimated source of radiation into the shape desired for polymerization. Thus, the polymerized area is defined by the shaped and focused light combined with the shape of the channel rather than by a mask as in the embodiment above. The radiation can be visible, infrared or UV light at a wavelength greater than about 205 nm.

It is preferred that unreacted monomer be removed by flushing the capillary with a solvent such as acetonitrile. It was found that element 120 moved freely back and forth within microchannel 130 under applied pressure from either end of the microchannel until element 120 was seated against capillary 131. The end of capillary tube 130, distal from the joint, was attached to an HPLC pump to apply pressure to mobile polymer element 120. After polymer element 120 was seated against capillary 131 pressures greater than 5000 psi could be applied with no leakage of fluid across the interface between capillaries 130 and 131. However, when pressure was relieved the polymer element could be freely moved away from the capillary interface ("unseated"). Furthermore, it was found to be possible, by controlling the pressure applied to capillary 131, to extend polymer element 120 out of capillary 130 and then retract it back into the capillary.

Using the fabrication method set forth above, the inventors have show n that it is possible to make mobile polymer monoliths in-situ in channels ranging from 20 to 500 $\mu$m in diameter. Moreover, using the method described above there is, in principle, no reason why mobile monolithic polymer elements as small a few microns and as large as 1 cm in diameter cannot be made. However, as monolith size increases, the temperature of the polymer/solvent mixture during polymerization increases. This criterion can put a formulation-dependent limit on the possible monolith sizes.

Figure 7:
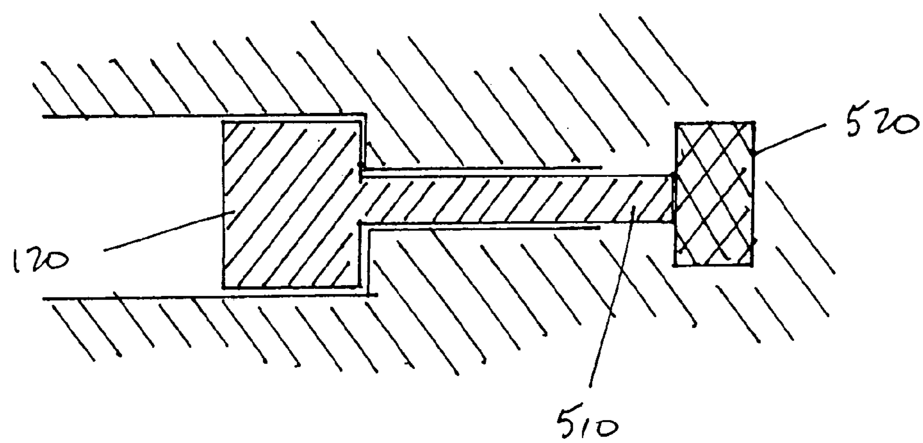
FIG. 7 shows a mechanical actuator embodiment.

The embodiment illustrated in FIGS. 5*a* and 6 can be modified to provide a mechanical actuating function, as illustrated in FIG. 7. Here, an actuator of conventional design consisting of a monolithic mobile element 120 and actuating rod 510 is disposed in a microchannel arrangement, such as shown. Application of an alternating pressure to the end of element 120 opposite the actuating rod causes actuating rod 510 to periodically engage the object 520 being mechanically actuated, such as a membrane, wheel, rocker, lever, pin, or valve.

Figure 8A:
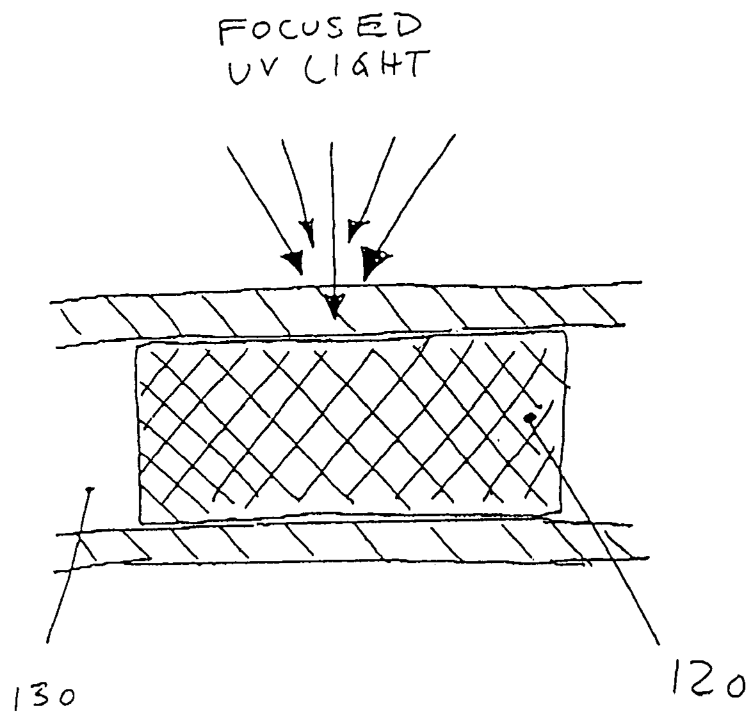
FIG. 8 is a schematic illustration of a method of selective depolymerization.
Figure 8B:
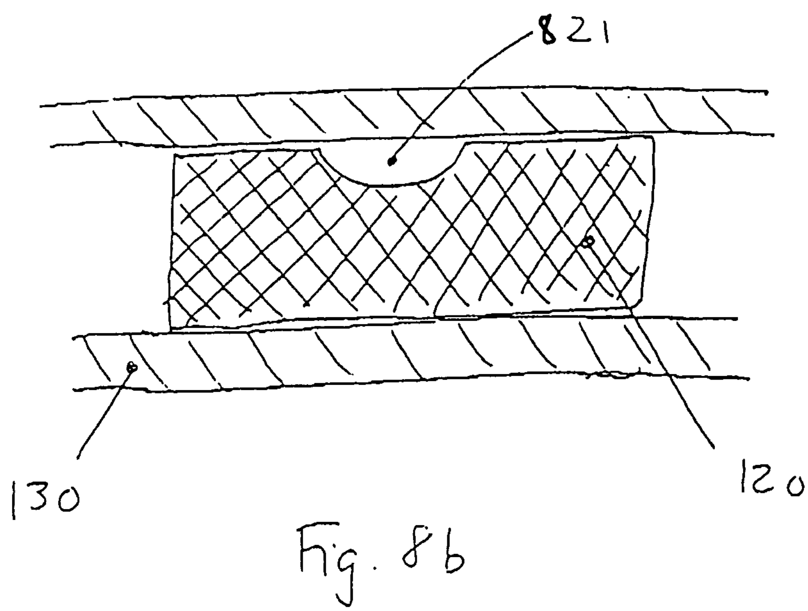

The polymer composition, prepared as above, possesses the additional advantage in that it can be depolymerized by energetic radiation (thermal or UV). By way of example, the selective application of 257 nm light from a frequency doubled Argon-ion laser to various parts of a polymer monolith, prepared by the method above, can cause depolymerization of the polymer in those areas exposed to the radiation, as show n in FIG. 8*a*, a side view of a microchannel and the polymer monolith contained therein. During the step of selective depolymerization, it can be desirable to periodically or continuously flush the illuminated region of the polymer monolith, to prevent depolymerized material, or its decomposition products, from clogging the microchannel. Video pictures of the depolymerization step have show n that monolithic elements depolymerize slowly from that part of the monolith upon which the light is incident; it is believed that this is because the polymer strongly absorbs mid- to deep-UV light within a distance of a few microns from the surface. Hence, by ending the exposure before the entire depth of the monolith is depolymerized, a gap 821 may be lithographically patterned between the top of the microchannel and the polymer monolith itself, as shown in FIG. 8*b*. In this way, it is now possible to make three-dimensional structures that cannot be produced by conventional lithographic polymerization, and would be impossible to machine conventionally. The dimensions of the area to be depolymerized are delineated by a mask and/or focusing of a laser, and the depth of the removed region is determined by the intensity of the incident light and the duration of exposure. Since the microchannel formed by traditional micromachining techniques (wet or dry etching) are not cylindrical, the cast-in-place polymer monolith is naturally constrained from rotating, unless there is extensive depolymerization along the entire length of the monolith.

Figure 9:
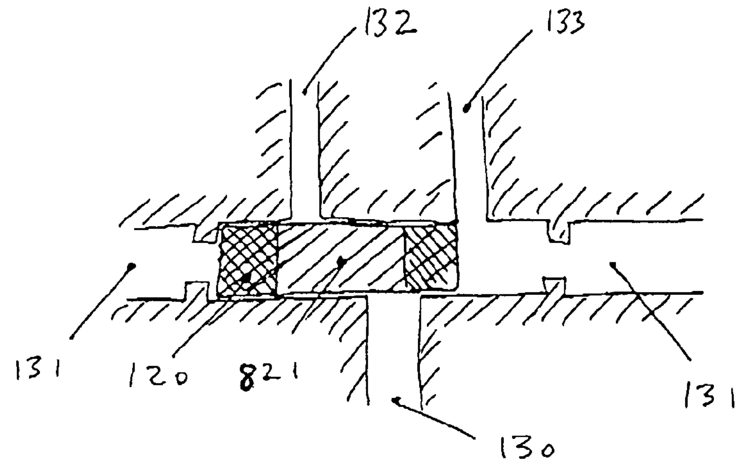
FIG. 9 shows a diverter valve configuration produced by laser depolymerization of a cast-in-place polymer element.

FIG. 9 shows a plan view of a diverter or 2-way valve structure manufactured using the selective depolymerization method set forth above. The mobile monolithic element 120 has a depolymerized gap 821 along its top (as show n in FIG. 8*b*), formed near its center for diverting fluid from one microchannel into either of two separate microchannels. Microchannel 131 provides a common intersection for microchannels 130, 132, and 133. Application of pressure to microchannel 131 causes polymer element 120 to be drawn to one side blocking fluid flow from microchannel 130 into one of the parallel opposing microchannels (132 or 133). Application of pressure to the other side of element 120 causes fluid flow to be blocked to the other microchannel. This device has the property that, the pressures within microchannels 130, 132, and 133 impose no differential pressure across the length of element 120. Hence element 120 can be actuated by pressures much lower than the pressure in the controlled microchannels 130, 132, and 133.

Figure 10:
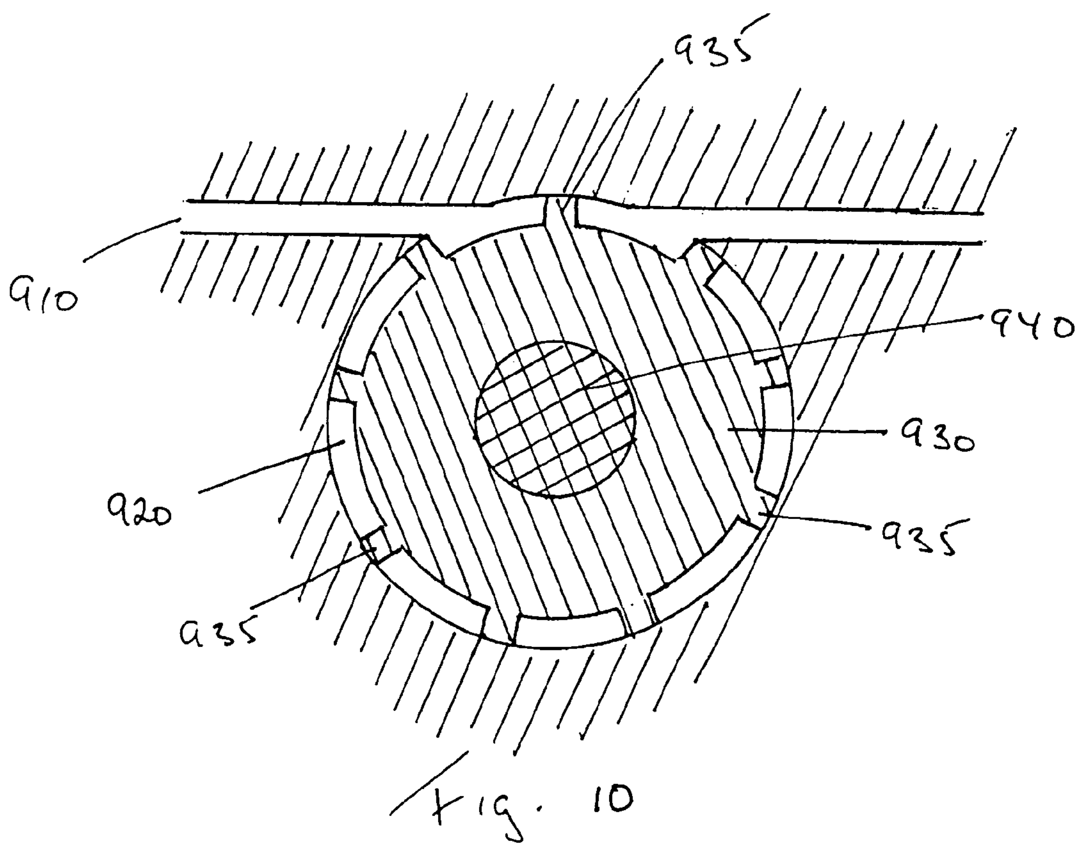
FIG. 10 illustrates a flow meter.

The invention is not limited to plug-shaped geometries for the polymer element. FIG. 10 illustrates an embodiment of the invention as a rotational flow meter. Here, microchannel 910, having an inlet and outlet segment, intersects a cavity 920, which separates the inlet and outlet segments of microchannel 910. The cavity is micromachined so as to leave a central hub 940. A rotatable polymer disc 930, having a plurality of projections 935 distributed around its circumference, is disposed in cavity 920 and on hub 940 around which it rotates. The projections can be uniformly distributed around the circumference and the space between the projections defines a fixed volume. Thus, each partial rotation of polymer disc 930 injects a fixed volume of fluid, delivered by the inlet segment of microchannel 910, into the outlet segment of the microchannel. Detection of the movement of the polymer disc can be achieved by a wide range of optical techniques. By way of example, a weak but focused light can be projected into the path of polymeric projections 935. Each time a polymer projection moves onto the light beam a portion of the light will be absorbed and the decrease in intensity of the light beam can be detected.

In another embodiment of the invention, a means for rectifying the output of an electrokinetic pump (EKP) is provided. An EKP is a device for converting electric potential to hydraulic force. By means of an EKP, electroosmotic flow, i.e., electric field-induced flow, is used to provide high pressure hydraulic forces for pumping and/or compressing liquids. A more detailed discussion of the theory and operation of electrokinetic pumps can be found in U.S. Pat. No. 6,277,257 issued Aug. 21, 2001 and entitled "Electrokinetic High Pressure Hydraulic System", incorporated herein by reference in its entirety.

Figure 11:
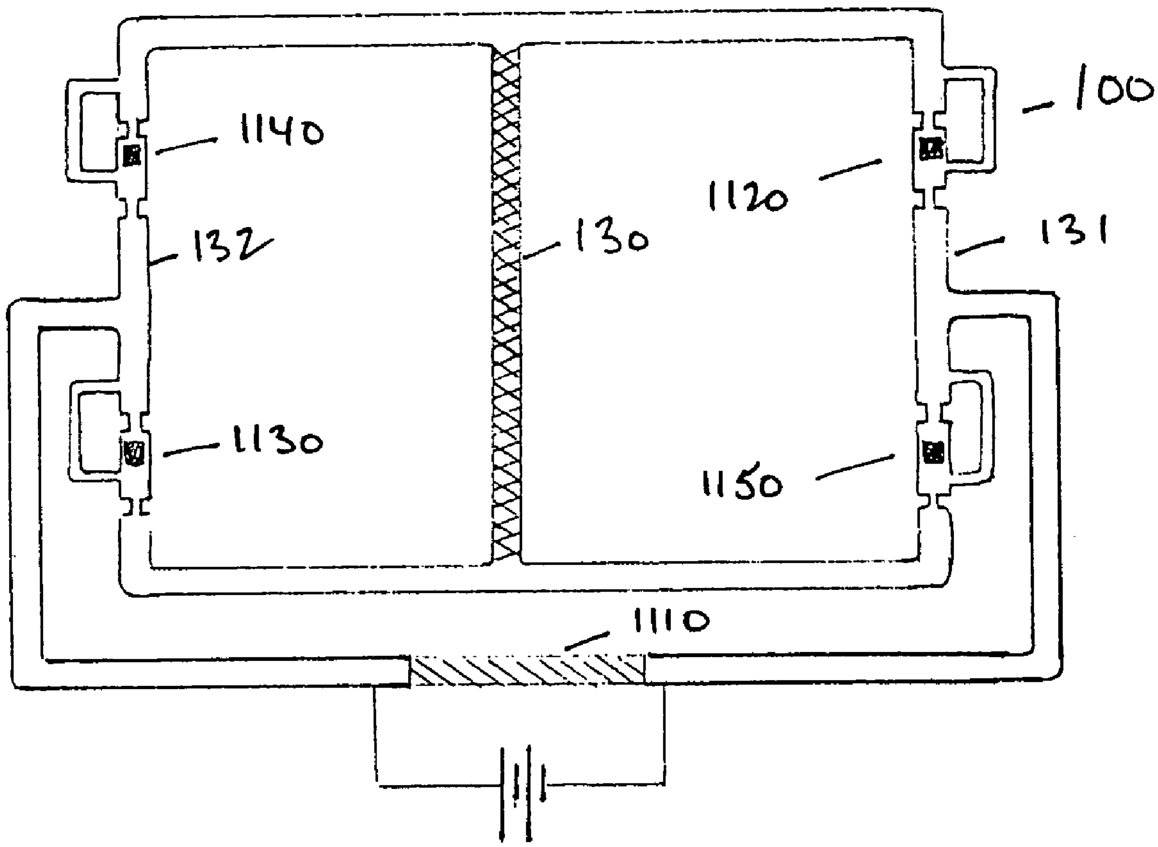
FIG. 11 is a schematic illustration of a valve configuration for rectifying fluid flow.

In electrokinetic pumping, an electric potential on the order of hundreds to thousands of volts, well above the potential required for electrolytic decomposition of any electrolyte, is required to develop the desired high pressures. Electrolytic decomposition of the electrolyte results in gas generation and the gas generated at the high pressure side of an electrokinetic pump can form bubbles that can block the current flow required for pressure generation, causing pump failure. This condition is particularly troublesome in miniaturized applications, such as in capillary tubes or microchannels, an area where the use of electric field-induced hydraulic pressure for manipulation of liquids holds great promise, but where current flow can be easily blocked. The problem of bubble formation can be substantially overcome by the use of an alternating current (AC), wherein the direction of current flow is reversed every 5–20 minutes. While desirable as a means of removing the problem of bubble formation, reversal of current flow also leads to reversal of fluid flow which can be undesirable. However, by configuring the check valve embodiment illustrated in FIG. 1 in an orientation analogous to a diode bridge for rectifying electrical current, such as illustrated in FIG. 11, microchannel fluid flow is unidirectional regardless of current flow. Furthermore, this "diode bridge" configuration provides further advantage in that there if little is any drop in fluid flow rate when current is switched. The rate of fluid flow decrease is governed by the time required to fill the dead volume of the check valves as compared to the frequency with which the flow direction need be switched. Typically, the flow direction need be switched only once every 5–20 minutes, while the dead volume of the check valves fills in approximately 1 second. Thus, the total flow rate loss would be less than 1%. Moreover, reversing flow through the system illustrated in FIG. 11 by switching polarity of an EKP will not affect the fluid flow rate.

Operation of this embodiment is exemplified by reference to FIG. 11. Here, a central flow channel 130, having an inlet and an outlet end is connected to and in fluid communication with two auxiliary flow channels 131 and 132 disposed each side of channel 130. At least two check valves 100, such as described above and illustrated in FIG. 1, are contained in a series arrangement in each auxiliary flow channel. Hydraulic pressure means, such as an EKP 1110, is provided for moving a fluid through channels 130, 131, and 132. The inlet and outlet of EKP 1110 are connected to auxiliary flow channels 131 and 132 between the check valves disposed therein. In operation, when fluid flow s through the system from left to right, valves 1120 and 1130 open while valves 1140 and 1150 close. Thus, fluid flow proceeds from the top to the bottom of central flow channel 130. On the other hand, when fluid flows from right to left, valves 1140 and 1150 open and valves 1120 and 1130 close. In this case also, fluid flow s from the top to the bottom of central flow channel 130.

High-performance liquid chromatography (HPLC) is an established analytical technique that relies on high-pressure mechanical pumps (generally a gear- or cam-driven pump capable of generating pressures in excess of 5,000 psi) to drive a fluid sample through a specially prepared column for analysis. However, it is difficult to adapt these pumps to provide the low flow rates under high pressure required for microbore HPLC systems. An electrokinetic pump (EKP), as described above, provides a desirable alternative to conventional high-pressure mechanical pumps for microfluidic HPLC systems. However, as explained above, the problem of gas blocking of microchannels is an undesirable feature of the use of an EKP for high pressure microfluidic systems. This problem can be overcome by the use of alternating current flow (switching polarity) and the rectifying valve system described above.

Figure 12:
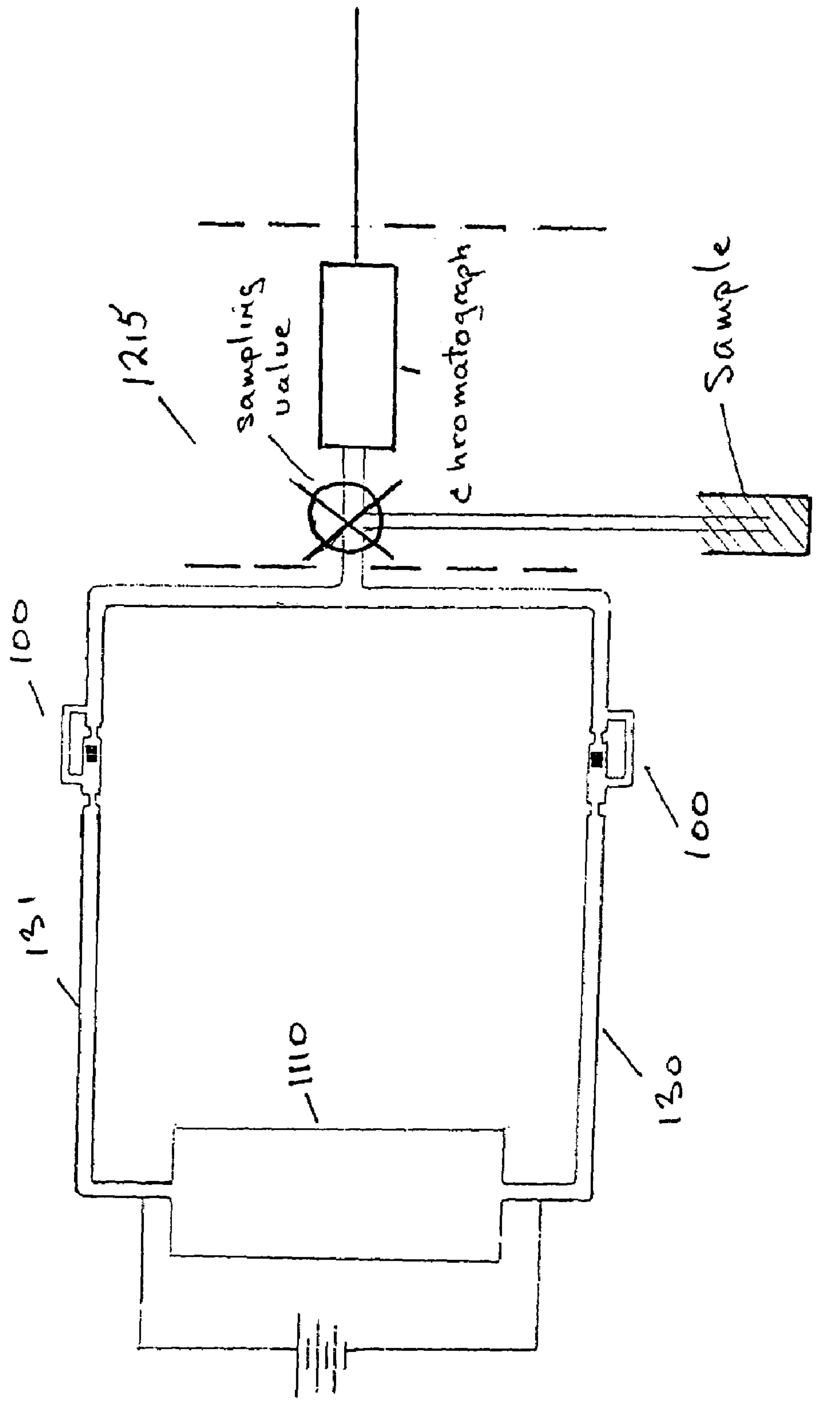
FIG. 12 is a schematic of a valve configuration for HPLC sample injection.

A rectifying valve system in HPLC that can provide substantially continuous, unidirectional flow through a chromatography column during polarity reversal, is exemplified by reference to FIG. 12. The inlet and outlet ends of EKP 1110 connected to microchannels 130 and 131 that are joined at a common intersection that, in turn is connected by a microchannel to an HPLC system 1215. Each microchannel has a check valve 100 disposed therein. When EKP 1110 pumps fluid along microchannel 130 the check valve disposed therein is open while that in microchannel 131 is closed. When fluid is pumped along microchannel 131, valve operation is reversed. In both cases, however, fluid flow is directed, substantially continuously, into the HPLC system.

In several applications of the devices for controlling fluid flow described herein an actuation fluid, i.e., a fluid that drives the mobile polymer monolith, can come into contact with the fluid whose movement is being controlled, or test fluid. In many cases the test fluid is either being analyzed, in which case contact and possible contamination with the actuation fluid is undesirable, or the compositions of the two fluids are so different that co-mingling could lead to experimental problems, such as sample dispersion in chemical separations, unwanted chemical reactions, voltage fluctuations in electrokinetically driven systems. These potential problems can be eliminated by the use an alternative on/off valve embodiment, such as that illustrated in FIG. 13.

Figure 13:
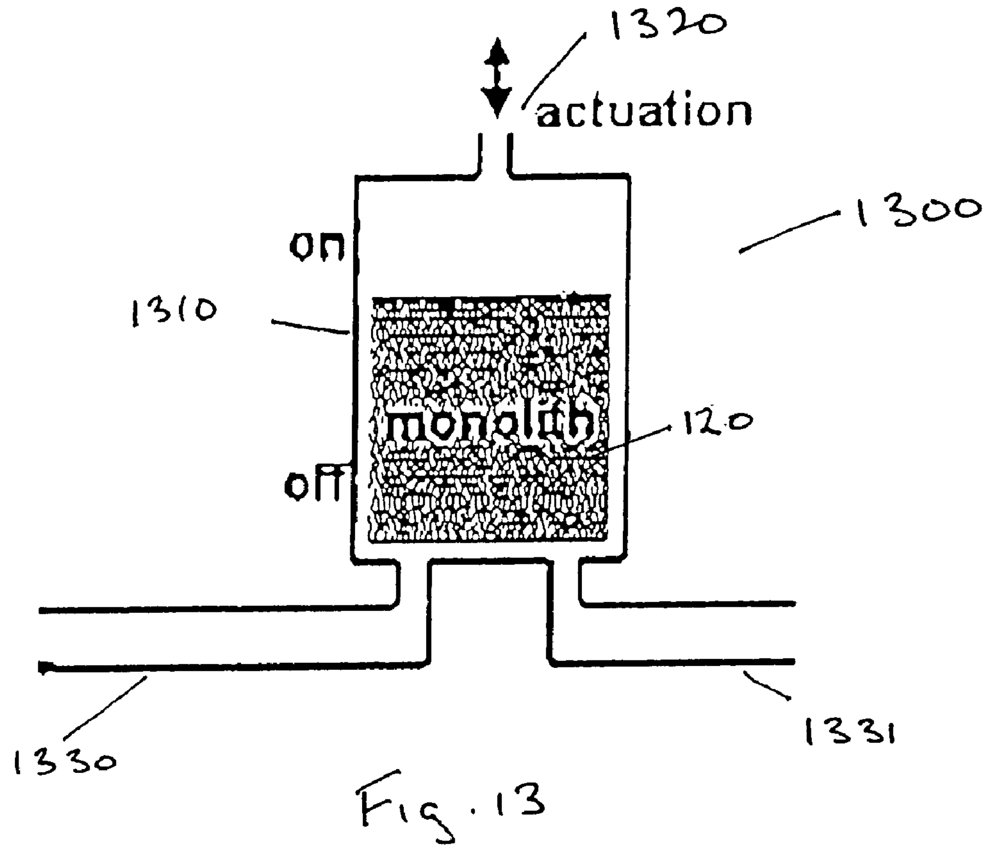
FIG. 13 illustrates an alternative shut-off valve embodiment.

Referring now to FIG. 13, on.off valve 1300 comprises a polymer monolith 120 contained within chamber 1310 having a fluid inlet channel 1320 disposed on a first end, or top, of chamber 1310 that provides access for an actuating fluid. A flow inlet channel 1330 and flow outlet channel 1331, that together comprise a fluid flow channel and carry a test fluid that can be the same of different from the actuating fluid, are joined to the second end, or bottom, of chamber 1310 opposite actuating fluid inlet 1320. In operation, when an actuating fluid pressure is applied to polymer monolith 120, the monolith is forced against the bottom of chamber 1310 thereby sealing the intersections of the fluid inlet and outlet tubes and prohibiting flow of the test fluid dow n the flow channel. Application of a negative pressure, or withdrawal of the actuating fluid, causes the polymer monolith to move up against the top end of the chamber allowing the test fluid to flow through the valve. Since the actuation and test fluids never come into contact with each other they can be different and can be specifically tailored for their purpose. For example, the actuation fluid can be designed to optimize the performance of an EKP.

Figure 14:
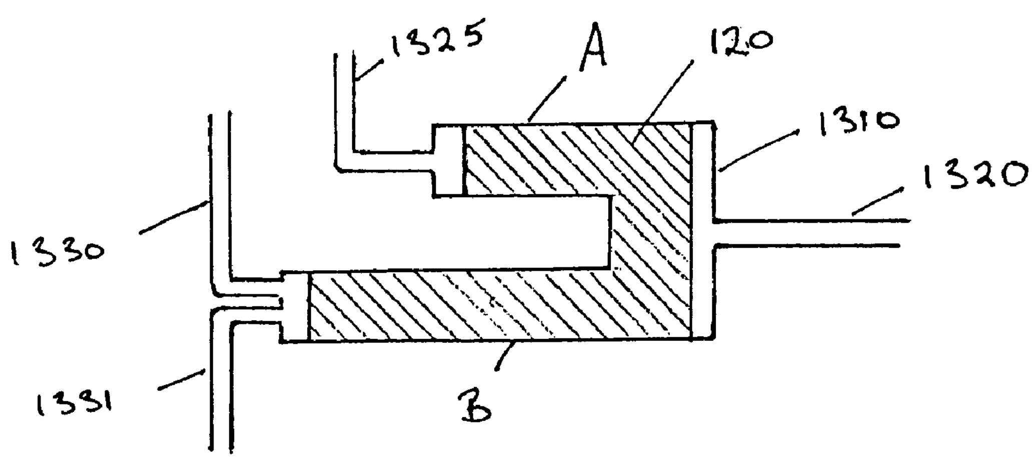
FIG. 14 illustrates a shut-off valve employing positive pressures for actuation.

For some applications it can be impractical to apply a negative pressure to polymer monolith 120. In those situations an alternative design can be used, such as that illustrated in FIG. 14. Here, chamber 1310 has two arms or branches A and B arranged generally in a U-shape configuration. Polymer monolith 120, contained in chamber 1310 extends into each arm. First arm A terminates in a fluid inlet 1325 that admits an actuating fluid to one arm of chamber 1310. A flow inlet tube 1330 and flow outlet tube 1331, that together comprise a fluid flow channel and carry a test fluid, converge at the termination of second arm B. An actuating fluid inlet 1320 joined to the end of chamber 1310 opposite the terminations of first and second arms A and B provides access for an actuating fluid. Applying fluid pressure through fluid inlet 1320 shuts off flow through the flow channel. Applying fluid pressure through fluid inlet 1325 and releasing fluid pressure at inlet 1320 turns on flow. It should be noted, as above, that the actuating fluid(s) never come into contact with the test fluid flowing through the flow channel.

In summary, the present invention is directed to a cast-in-place mobile, monolithic polymer element for controlling fluid and ionic current flow in microchannel systems and method of manufacture thereof. Fluid flow control devices for microfluidic applications, and microvalves can be made incorporating the cast-in-place, mobile monolithic polymer element of the invention, disposed within a microchannel, and driven by a displacing force that can be an electric field or fluid or gas pressure against a sealing surface to provide for control of fluid flow. As a means for controlling fluid flow, these devices possess the additional advantage that they can be used translationally and/or rotationally to effect pressure driven, electroosmotic, or electrophoretic flow, to eliminate or enhance diffusive or convective mixing, to inject fixed quantities of fluid, to rectify fluid flows, and to selectively divert flow from one channel to various other channels. The polymer elements are made by the application of lithographic methods to monomer mixtures formulated in such a way that the resulting polymer element will not bond to microchannel wails and will retain structural shape upon exposure to a variety of solvents. These polymer elements can seal against pressures greater than 5000 psi, and have a response time on the order of milliseconds. Finally, by the use of energetic radiation it is possible to depolymerize selected regions of the polymer element to form shapes that cannot be produced by conventional lithographic patterning and would be impossible to machine.

We claim:

1. A method for making a mobile, monolithic polymer element in a microchannel, comprising;

a) injecting a monomer mixture dissolved in a solvent into the microchannel, wherein the composition of the monomer mixture is such that the polymer formed by polymerizing the monomer does not bond to the microchannel wall;

b) polymerizing the monomer by application of radiation; and c) flushing unpolymerized monomer mixture from the microchannel.

2. The method of claim 1, wherein the radiation is UV, visible, or infrared radiation.

3. A method for making a monolithic polymer element in a microchannel such that the polymer element conforms to the configuration of the microchannel and does not bond to the microchannel wall, comprising the steps of:

preparing a monomer mixture comprising at least;

a cross-linking agents selected from the group including ethylene glycol diacrylate, diethylene glycol diacrylate, propylene glycol diacrylate, butanediol diacrylate, neopentyl glycol diacrylate, hexanediol diacrylate, pentaerythritol triacrylate, pentaerythritol tetracrylate, trimethylolpropane triacrylate, a nonpolar monomer selected from the group branched or straight chain $C_1$–$C_{12}$ alkyl acrylates, fluorinated or methacrylate versions of these monomers, or styrene, and a monomer capable of carrying a charge at a pH of between about 2 and 12 selected from the group including $C_1$–$C_{12}$ alkyl or aryl acrylates substituted with sulfonate, phosphate, boronate, carboxylate, amine, or ammonium;

adding the monomer mixture to a solvent, comprising at least;

one of the group including $C_1$–$C_6$ alcohols, $C_4$–$C_8$ ethers, $C_3$–$C_6$ esters, $C_1$–$C_4$ esters, $C_1$–$C_4$ carboxylic acids, methyl sulfoxide, sulfolane, or N-methyl pyrrolidone, dioxane, dioxolane, or acetronitrile, and a polymerization initiator, wherein the monomer/solvent mixture forms a single phase mixture at a temperature below about 40° C., and wherein the monomer to solvent ratio is between about 90:10 to 30:70;

loading the mixture into a capillary tube;

polymerizing the mixture by exposing at least a potion of the mixture to radiation; and flushing unpolymerized monomer from the microchannel.

4. The method of claim 3, wherein the portion of the monomer mixture exposed to radiation is defined by focusing a point or collimated source of radiation into the shape desired for polymerization.

5. The method of claim 3, wherein the portion of the monomer mixture exposed to radiation is defined by a mask.

6. The method of claim 3, wherein the radiation includes thermal, visible, or UV radiation, and wherein the wavelength of the UV radiation is equal to or greater than about 257 nm.

7. A mobile polymer monolith disposed in a microchannel and made by the method of claim 3.

8. A device for controlling fluid flow in a microchannel, comprising a mobile monolithic polymer element disposed in the microchannel, wherein said polymer element is made by the method of claim 1;

at least one retaining means disposed in the microchannel; and means for applying a displacing force to the either end of the microchannel.

9. A method for making a shaped monolithic polymer element disposed within a microchannel, comprising:

a) injecting a monomer mixture dissolved in a solvent into the microchannel, wherein the composition of the monomer mixture is such that the polymer formed by polymerizing the monomer does not bond to the microchannel wall;

b) polymerizing the monomer by application of radiation;

c) flushing unpolymerized monomer mixture from the microchannel;

d) exposing the surface of the polymer element to radiation to depolymerize a portion of the surface and thereby shape the polymer element; and flushing the microchannel with a liquid to remove depolymerized material.

10. The method of claim 9, wherein the source of radiation is a laser.

11. The method of claim 10, wherein the laser is a frequency doubled Argon-ion laser operating at 257 nm.

12. A method of making a mobile, monolith polymer element in a microchannel, comprising:

a) preparing a monomer mixture by mixing together 1,3-butanedioldiacrylate, tetrahydrofurfuryl acrylate, hexyl acrylate, acryloyloxyethyltrimethylammonium methyl sulfate, and a photoinitiator;

b) preparing a solvent mixture by mixing together acetonitrile, methoxyethanol, and phosphate buffer;

c) mixing together the monomer and solvent mixtures in the ratio of about 60:40 by volume;

d) loading the combined mixture into a microchannel;

e) polymerizing the combined mixture by exposure to UV radiation; and, f) flushing unreacted monomer from the microchannel.

13. A mobile monolithic polymer element disposed within a microchannel made by the method of claim 12.

14. A method of making a mobile monolithic polymer element in a microchannel, comprising:

a) preparing a monomer/solvent mixture by combining together pentaerythritol triacrylate (PETRA), hyroquinone monomethyl ether, 1-propanol, and an amount of photo-initiator equal to about 0.5% of the weight of the PETRA;

b) injecting the monomer/solvent mixture into a microchannel; and c) photopolymerizing the mixture.

15. The method of claim 14, wherein the photo-initiator is 2,2'-azobisisobutyronitrile.

16. A mobile monolithic polymer element disposed within a microchannel made by the method of claim 14.

17. A device for controlling fluid flow in a microchannel, comprising a mobile monolithic polymer element disposed in the microchannel, wherein said polymer element is made by the method of either claim 12 or claim 14;

spaced apart retaining means disposed in the microchannel;

a bypass duct; and means for applying a displacing force to the either end of the microchannel.

* * * * *